United States Patent  
Pearman

(10) Patent No.: US 7,403,103 B2  
(45) Date of Patent: Jul. 22, 2008

(54) WHEEL MOUNTED POWER GENERATOR

(76) Inventor: Kevin Patrick Pearman, 21 Chaucer Avenue, Senderwood, Befordview, Gauteng (ZA)

( * ) Notice: Subject to any disclaimer, the term of this patent is extended or adjusted under 35 U.S.C. 154(b) by 374 days.

(21) Appl. No.: 10/540,001

(22) PCT Filed: Dec. 22, 2003

(86) PCT No.: PCT/IB03/06132

§ 371 (c)(1),
(2), (4) Date: Feb. 3, 2006

(87) PCT Pub. No.: WO2004/056590

PCT Pub. Date: Jul. 8, 2004

(65) Prior Publication Data

US 2006/0164225 A1 Jul. 27, 2006

(30) Foreign Application Priority Data

Dec. 20, 2002 (ZA) ............................... 2002/10332

(51) Int. Cl.
B60C 23/00 (2006.01)
B60C 23/02 (2006.01)
(52) U.S. Cl. ...................................... 340/444; 73/146.4
(58) Field of Classification Search ................. 340/438, 340/442, 444, 445, 447, 449; 73/146.2, 146.3, 73/146.4, 146.5, 146.6, 118; 324/174
See application file for complete search history.

(56) References Cited

U.S. PATENT DOCUMENTS

| 4,075,603 A | 2/1978 | Snyder et al. |
| 4,229,728 A | 10/1980 | Tremba |
| 4,536,668 A | 8/1985 | Boyer |
| 5,505,080 A * | 4/1996 | McGhee .................... 73/146.5 |
| 6,046,672 A | 4/2000 | Pearman |
| 6,742,386 B1 * | 6/2004 | Larson ...................... 73/146.4 |

FOREIGN PATENT DOCUMENTS

| EP | 93104631.2 | 10/1993 |
| EP | 98810025.1 | 7/1998 |
| WO | WO 02/36369 | 5/2002 |

* cited by examiner

Primary Examiner—Davetta W. Goins  
Assistant Examiner—Sigmund Tang  
(74) Attorney, Agent, or Firm—Fulbright & Jaworski; Jan K. Simpson

(57) ABSTRACT

The present invention is directed to a wheel condition detection and signalling device. The device includes a chamber which is capable of being attached to a wheel of a truck to rotate therewith and a pendulum having significant mass and is rotatably mounted within the chamber in such a manner that the pendulum remains generally non-rotating during rotation of the chamber. The device also includes a detector means for detecting an unacceptable condition of the wheel and emitting a signal dependent upon such condition and a transmitter for transmitting that signal to a receiver. The chamber carries a wire coil which is mounted on a core having two outside parallel arms provided with end faces. The pendulum carries a series of magnets of opposite polarity, the arrangement being such that on relative rotation of the chamber and the pendulum, the magnets will pass the end faces of the coil in adjacent relationship, and that when one magnet is adjacent one end face of the coil, another magnet of opposite polarity is adjacent the other end face of the coil whereby on relative rotation of the coils and the poles, an electric current is generated in the coils to energise the transmitter.

30 Claims, 16 Drawing Sheets

WHEEL MOUNTED POWER GENERATOR

Figure 1:
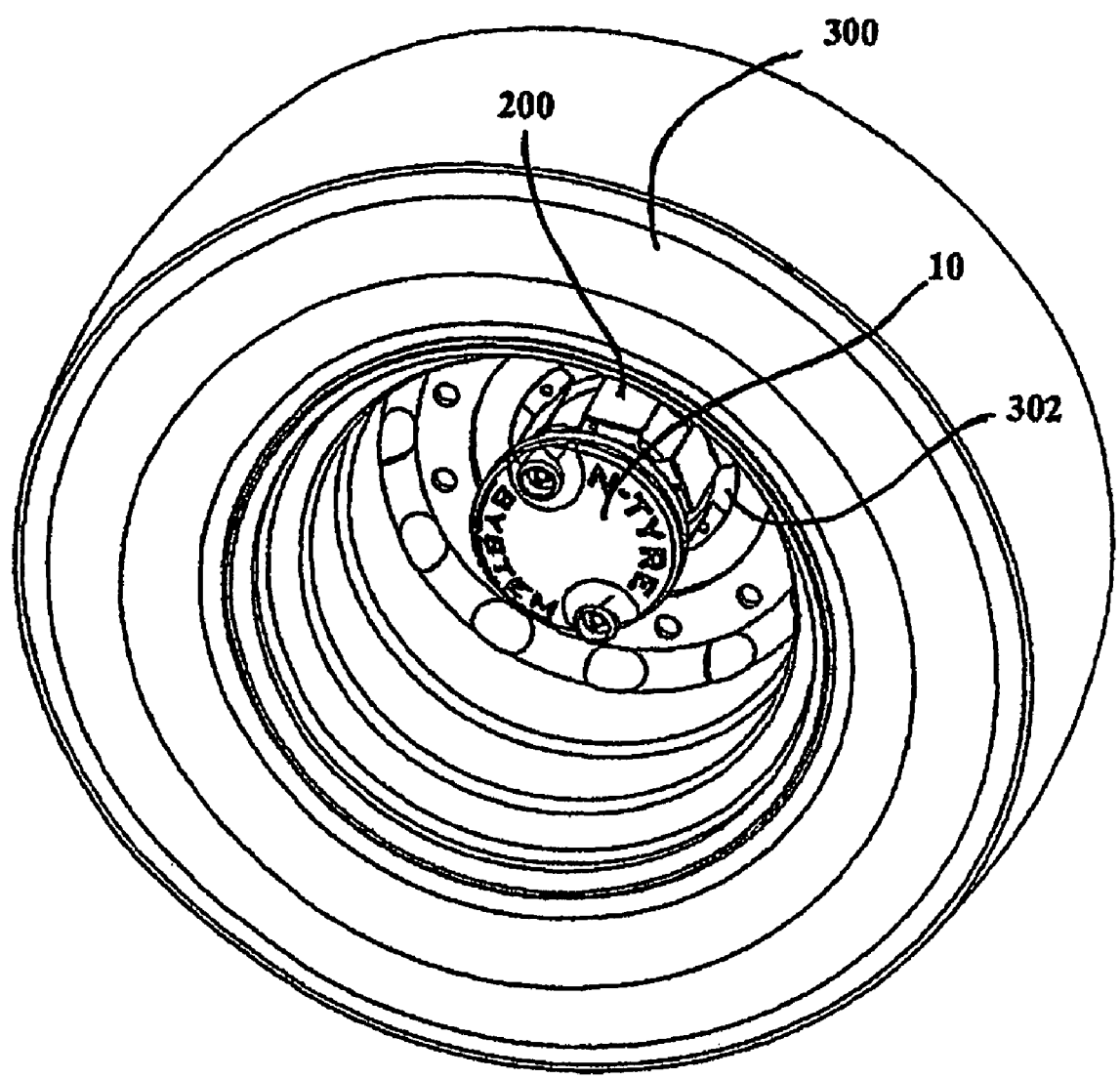

This invention relates to vehicles.

For various reasons the conditions of the wheels or tyres of vehicles become unacceptable. The most typical of these conditions occur when the air pressure in a tyre falls below a predetermined amount. Another unacceptable condition is when the wheel becomes overheated due for example to brakes or bearings over-heating and then jamming. A further unacceptable condition occurs when there is excessive vibration of the wheels indicating a possible tread separation of the tyre.

When tyres on vehicles and in particular on loaded trucks are under-inflated or flat, this causes serious wear and safety problems. In particular, riding with on a loaded truck on under-inflated or flat tyres, causes massive heat build up and distortion of the profile of the tyres. This causes excessive wear on the tyres and in extreme cases destroys the side walls and carcases of under-inflated or flat tyres.

When a "flat" occurs on a side-by-side configuration, the good tyre then bears the load of both the tyres causing excessive wear on the good tyre. The two tyres bulge and run against each other causing a tremendous heat build up. If this condition persists it can result in the destruction of both tyres. This is a costly event resulting also in the down-time of the vehicle. It also represents a considerable road hazard to other road users.

Furthermore there is the serious problem of large chunks of tyres (often the tread of re-treaded tyres) falling off. This can damage the host vehicle, and can result in the tyre remnants, being either thrown by the tyre into the path of oncoming traffic or just lying in the path of traffic threatening damage to vehicles on the road. Such thrown-off tyre chunks may also snag and damage the brake lines of the host vehicle resulting in brake failure. In addition the loss of parts of the tyre will cause unacceptable vibration of the wheel. The shredded tyres and expired casings also impact detrimentally on the environment.

It will be appreciated that tyres, and in particular tyres used on trucks and busses and lorries are extremely expensive items. Thus the destruction of a tyre has serious economic as well as safety consequences. In addition, if one or more tyres are deflated, this will cause increased drag on the vehicle which will result in increased fuel consumption and consequent increased cost in the running of the vehicle in question.

It follows that it is highly desirable to provide a wheel condition detection and signalling device (WCDSD) which will give a warning when there is an unacceptable condition of a wheel or tyre. Numerous deflation detectors (which are one type of WCDSD) have been proposed to provide the driver of a vehicle with a warning that one or more tyres is/are under inflated. Many of these detectors are required to transmit a signal on detection of under-inflation to a receiver in the cab of a truck so that the driver is aware of the condition. A significant requirement of such detectors is the provision of electrical power to power the detectors and transmitters. Clearly the use of batteries alone which have a finite life are not entirely satisfactory because they do not allow for constant signals or the continuous computerisation of data relating to the host vehicle.

A number of tyre deflation detectors have been proposed.

On the face of it these are usually theoretically capable of working. However it has been found that such devices are in most cases not sufficiently robust to withstand the various forces that are incurred at the axle of a truck and consequently the detectors fail. Alternatively the cost of manufacturing the detector become prohibitive. Furthermore it has been found that the power generated at the generator described above is often, if not usually, less than the requisite power for operating the transmitter to transmit the signal to the receiver. It is critical that the signals of one system do not interfere with those of another: yet it is also necessary to inter-change trailers without any manual settings being implemented to effect the change. No detection device that is capable of a fully automatic change-over of trailers has been found. Furthermore, it has been found that many detection devices are limited in the number of wheels that they can accommodate in the host vehicle with a maximum of 20 wheels being a typical limitation.

Typical of arrangements above described are to-be found in South African Patent No 97/6722 (corresponding to U.S. Pat. No. 6,046,672); U.S. Pat. No. 4,229,728 1997 (Tremba); U.S. Pat. No. 4,075,603 (Snyder); and U.S. Pat. No. 4,536,668 (Boyer) and European Patent 0 563 723 (Eurafrica Videomatic S.r.l.).

An attempt is made to overcome these problems in a new arrangement which embodies the invention.

According to one aspect of the invention there is provided a wheel condition detection and signalling device comprising:— a chamber which is capable of being attached to a wheel of a truck to rotate therewith, a pendulum having significant mass and being rotatably mounted within the chamber in such manner that the pendulum remains generally non-rotating during rotation of the chamber, detector means for detecting an unacceptable condition of the wheel and emitting a signal dependant upon such condition a receiver for receiving signals from other components of the system and a transmitter for transmitting that signal to a receiver wherein the chamber carries a coil, and conveniently two coils, which is mounted on a core having two outside parallel arms provided with end faces and the pendulum carries a series of magnets of opposite polarity, the arrangement being such that on relative rotation of the chamber and the pendulum, the magnets will pass the end faces of the coil in adjacent relationship, and that when one magnet is adjacent one end face of the coil, another magnet of opposite polarity is adjacent the other end face of the coil, so that on relative rotation of the coils and the poles, an electric current is generated in the coils.

The power from the coils may be used to power the transmitter directly or, and preferably, it is used in conjunction with battery means which provides power during very slow movement of the wheels, say less than 50 to 55 rpm and/or at a vehicle speed of less than about 10 kph. Preferably such battery is a rechargeable battery which is recharged by such power when the wheel is rotating above the said number of revolutions or the vehicle is travelling faster than the said speed. More than one battery may be used.

The magnets are preferably arranged in a circle on the pendulum centred on its axis of rotation and having a diameter approximately equal to the distance apart of the centres of the end faces of the coil.

There are preferably a "double odd number" (as defined below) of the magnets. By the term "double odd number" as used herein is meant an even number which when divided by two gives an odd number. The preferred number of magnets is six. The magnets are preferably arranged with their polar axes parallel to the axis about which the pendulum swings.

The pendulum conveniently comprises an annular part rotatably carried by a bearing and an eccentric weight projecting therefrom. The annular part carries the magnets on one face thereof. The eccentric weight preferably comprises lead or other heavy material and has a mass of between 200 gm and 500 gm and preferably between 320 gm and 360 gm and more preferably about 340 g. The weight is preferably bolted on to a member projecting from the annular part. The annular part further comprises a substantially cylindrical bearing carrier within which the bearing is received.

This bearing carrier preferably has inwardly directed means at its mouth or open end. The bearing carrier is capable of being resiliently distorted to permit the bearing to enter the said carrier, the arrangement being such that when the carrier returns from the distorted position, the inwardly directed means extends into the path of the bearing to prevent or inhibit it from being removed from the said bearing carrier. Further distortion of the bearing carrier after the insertion of a bearing is prevented by attaching a ring around the circumference of the bearing carrier. The bearing carrier is preferably provided with a plurality of pairs of closely spaced cuts or slots that define between them arms which can resiliently swing outwardly. The inwardly directed means are provided at the ends of the said arms. Reinforcing gussets, are preferably provided inbetween the cylindrical member and the annular member.

Where the unacceptable condition is a low tyre pressure, a pressure detection means is preferably incorporated in a chamber which is capable of being connected to a tyre to be subject to the pressure therein. A pressure detector is preferably provided within the chamber and is connected to the electrical means. The pressure detector is preferably mounted on the board, preferably a PCB, on which the electrical means is carried. A heat conductor is also preferably provided having a part projecting into contact with the part of the wheel and another part in direct or indirect communication with a heat detector connected to the electrical means. In addition the device preferably further comprises a vibration detector. The vibration detector conveniently comprises a cylinder with a movable clapper therein.

Additional or other detector means may be provided.

The device may with advantage be used on the wheels of a heavy duty vehicle such as a truck, bus, or taxi and also the wheels of a railway carriage.

An embodiment of the invention will now be described by way of example with reference to the accompanying drawings.

In the drawings:—

Figure 2:
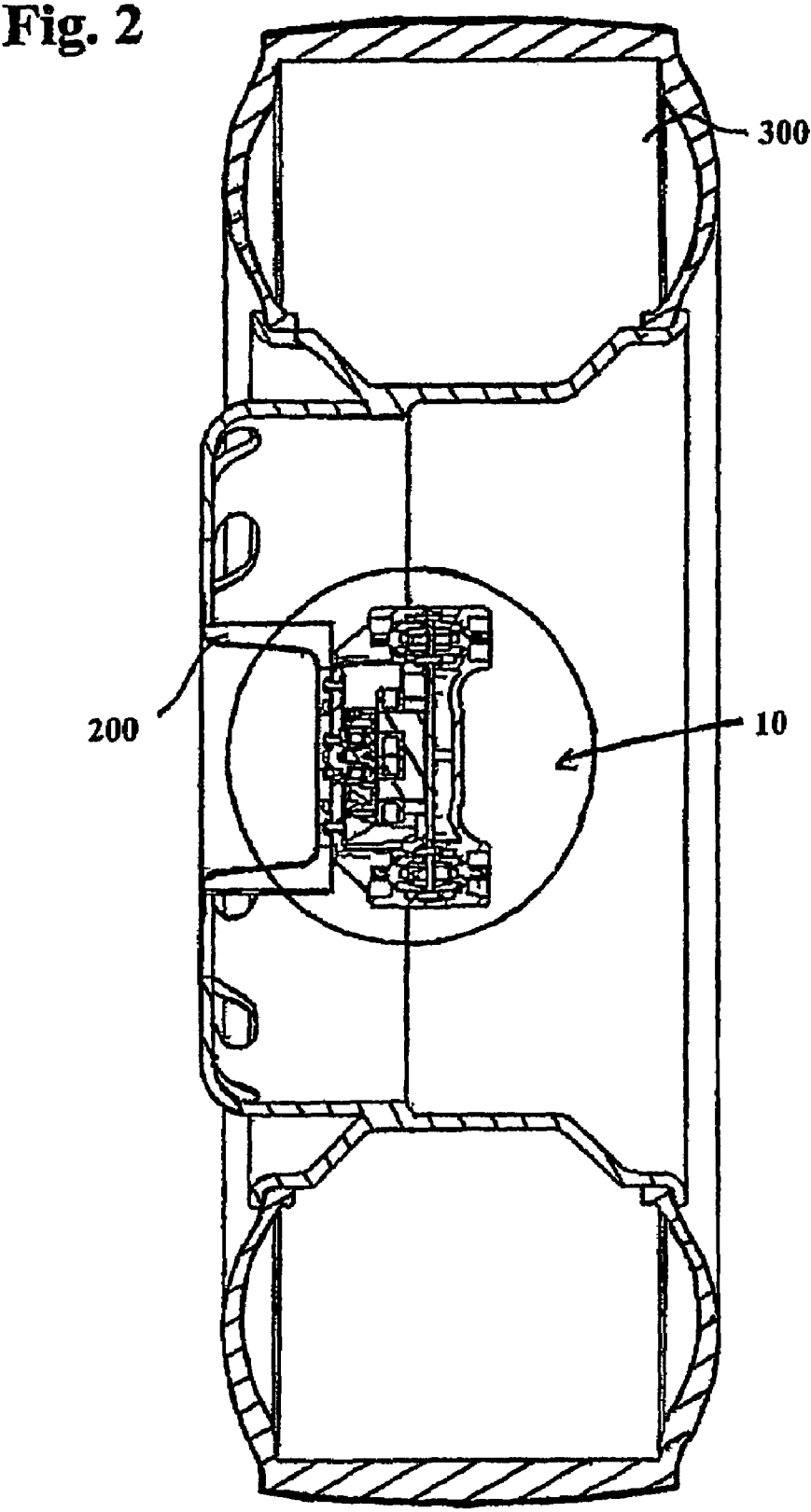
Figure 3:
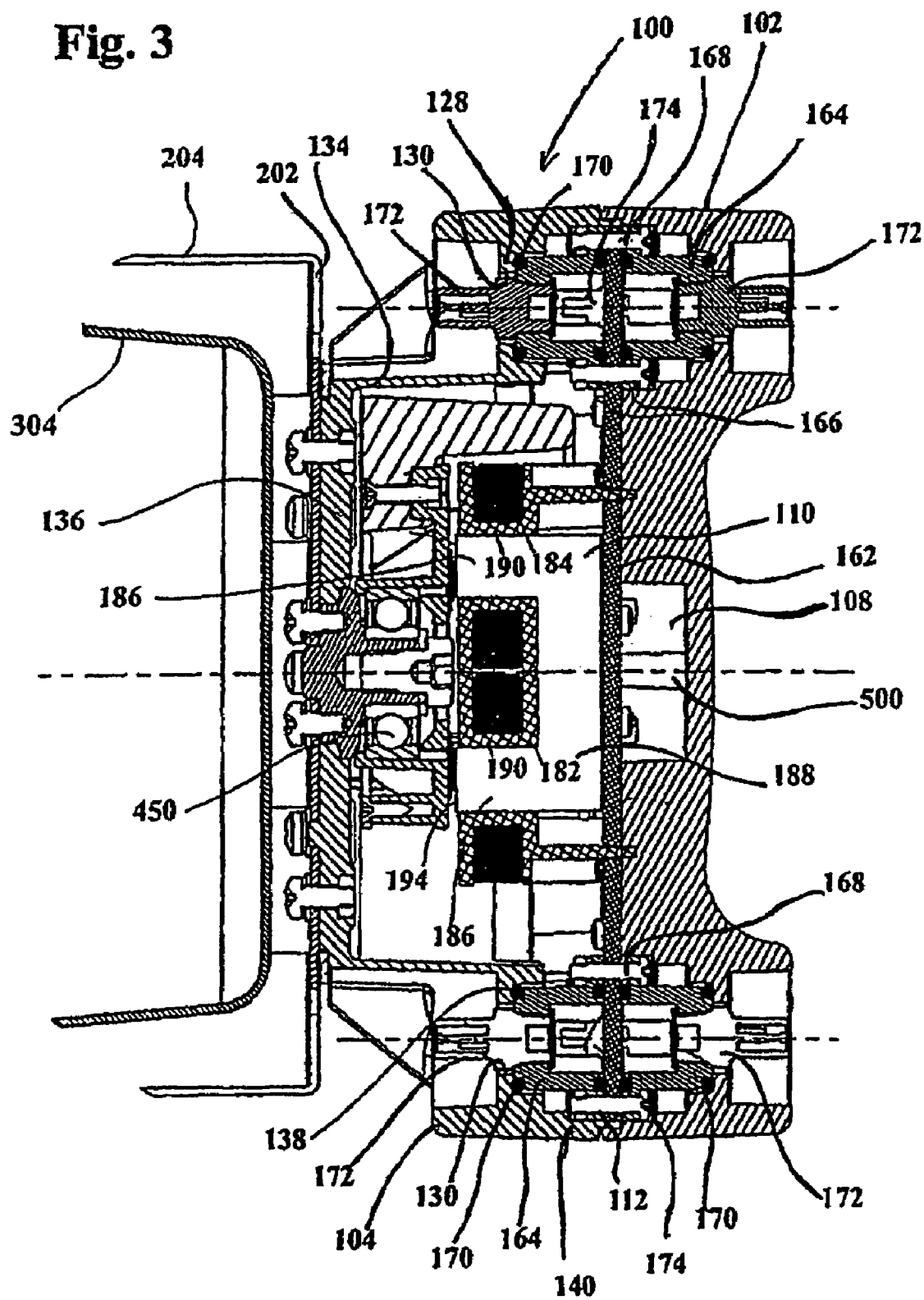
Figure 4:
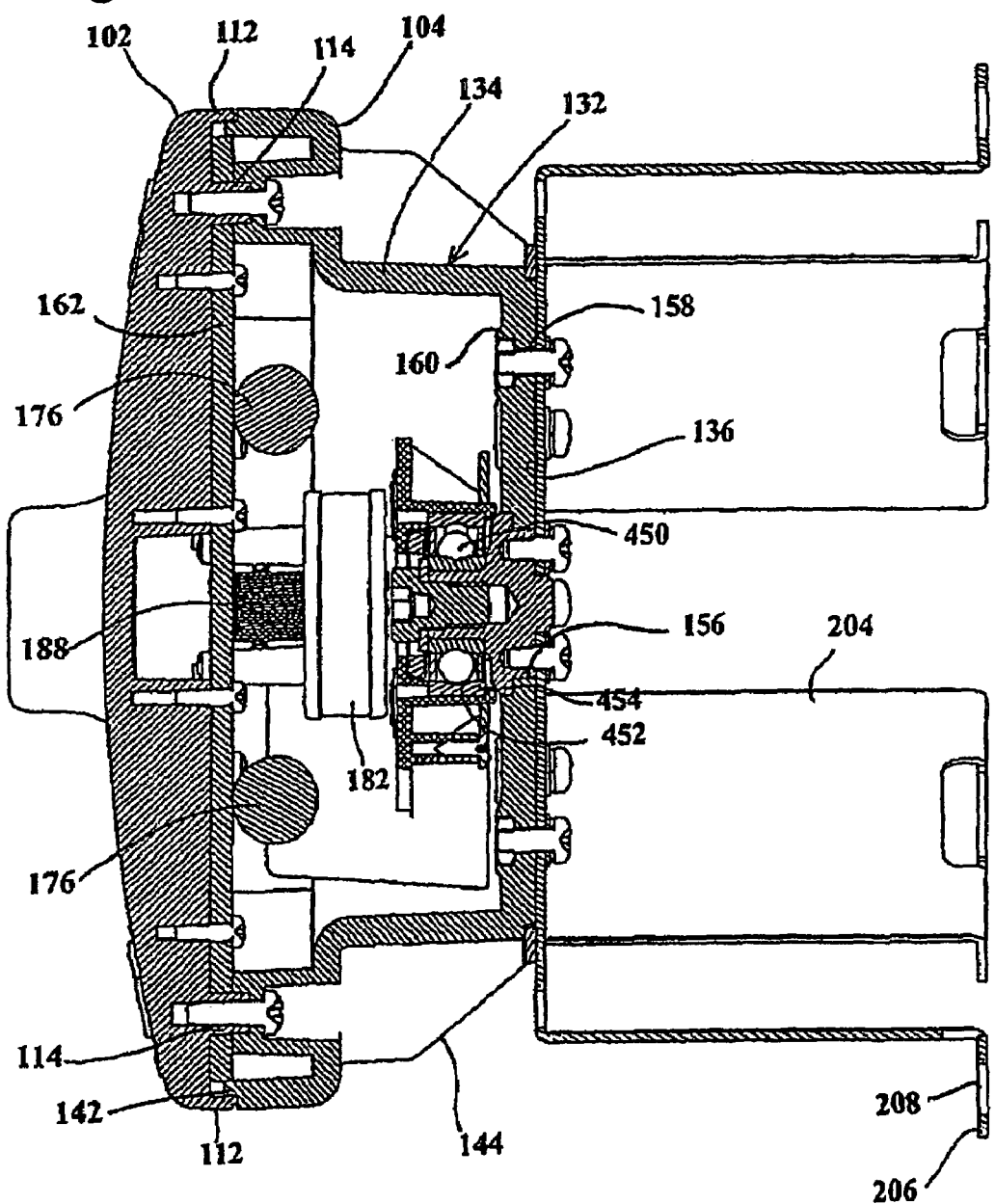
Figure 5:
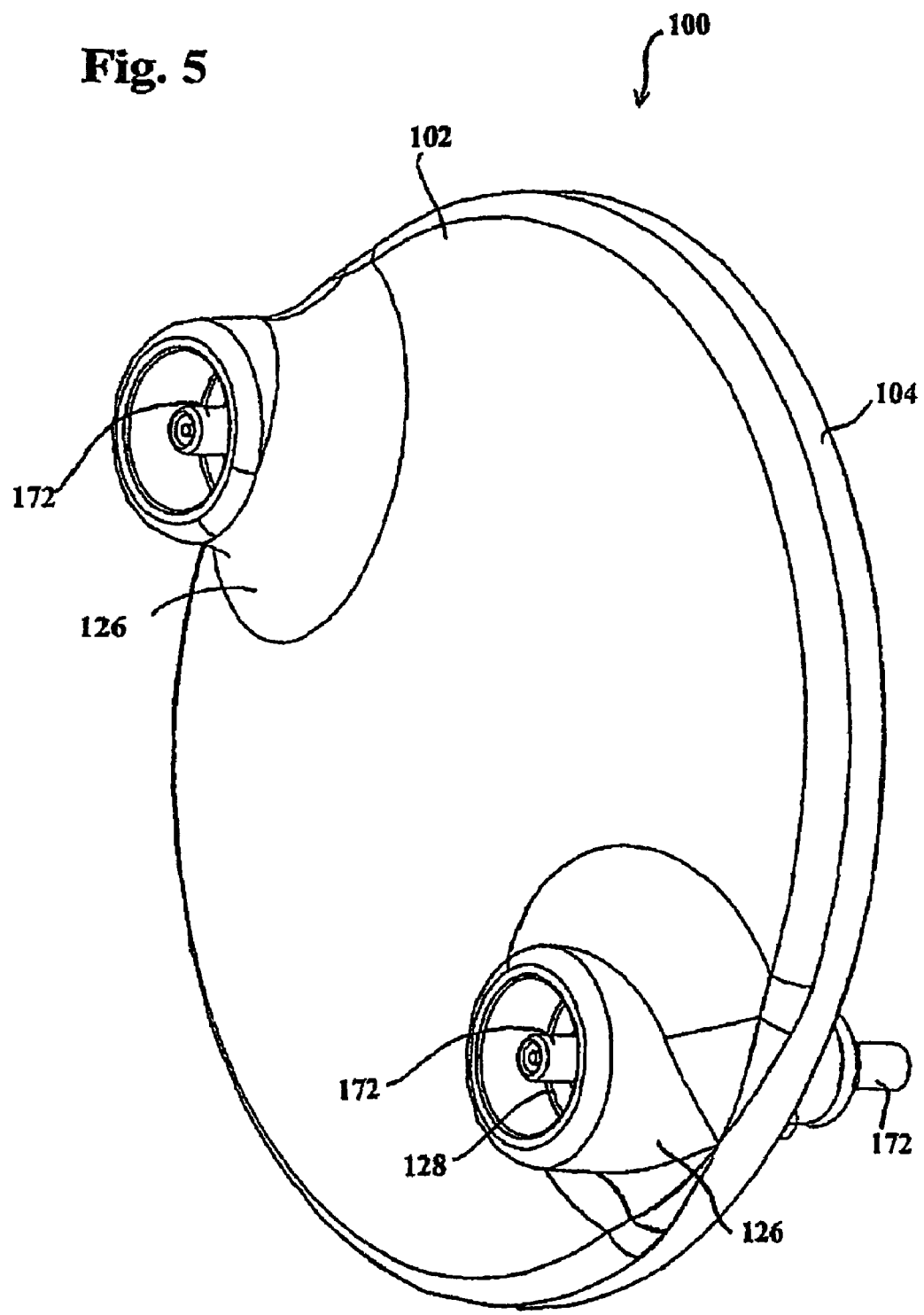
Figure 6:
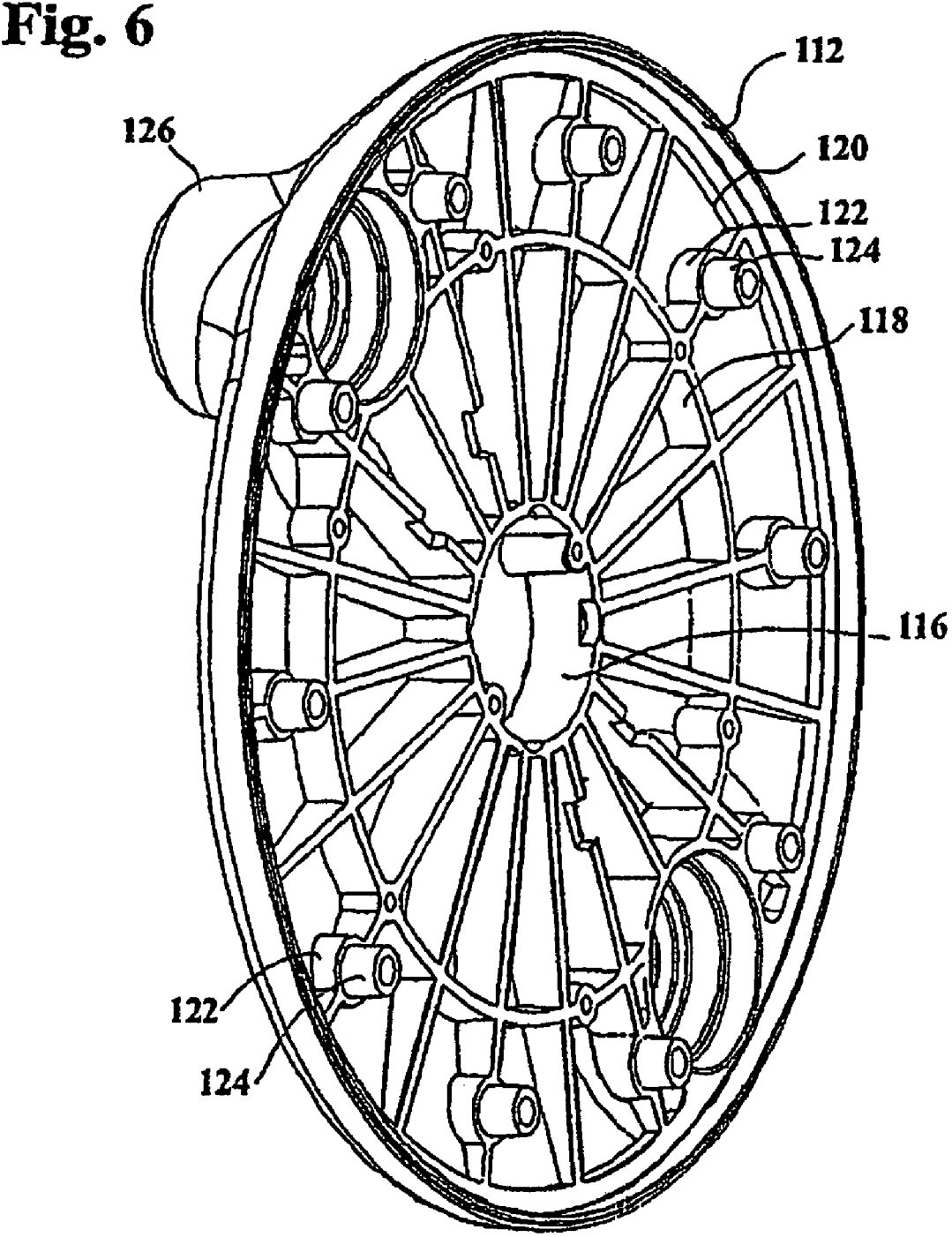
Figure 7:
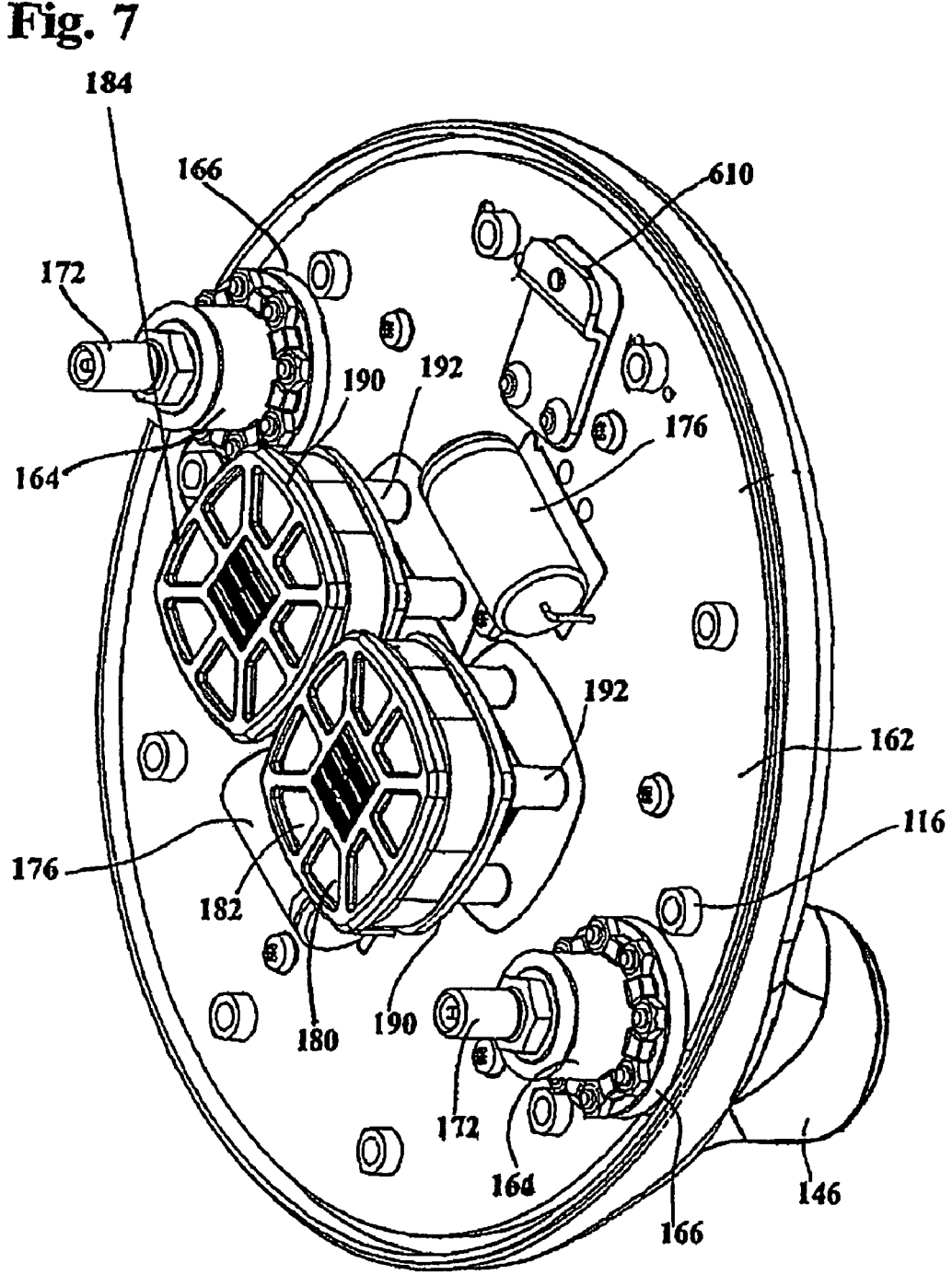
Figure 8:
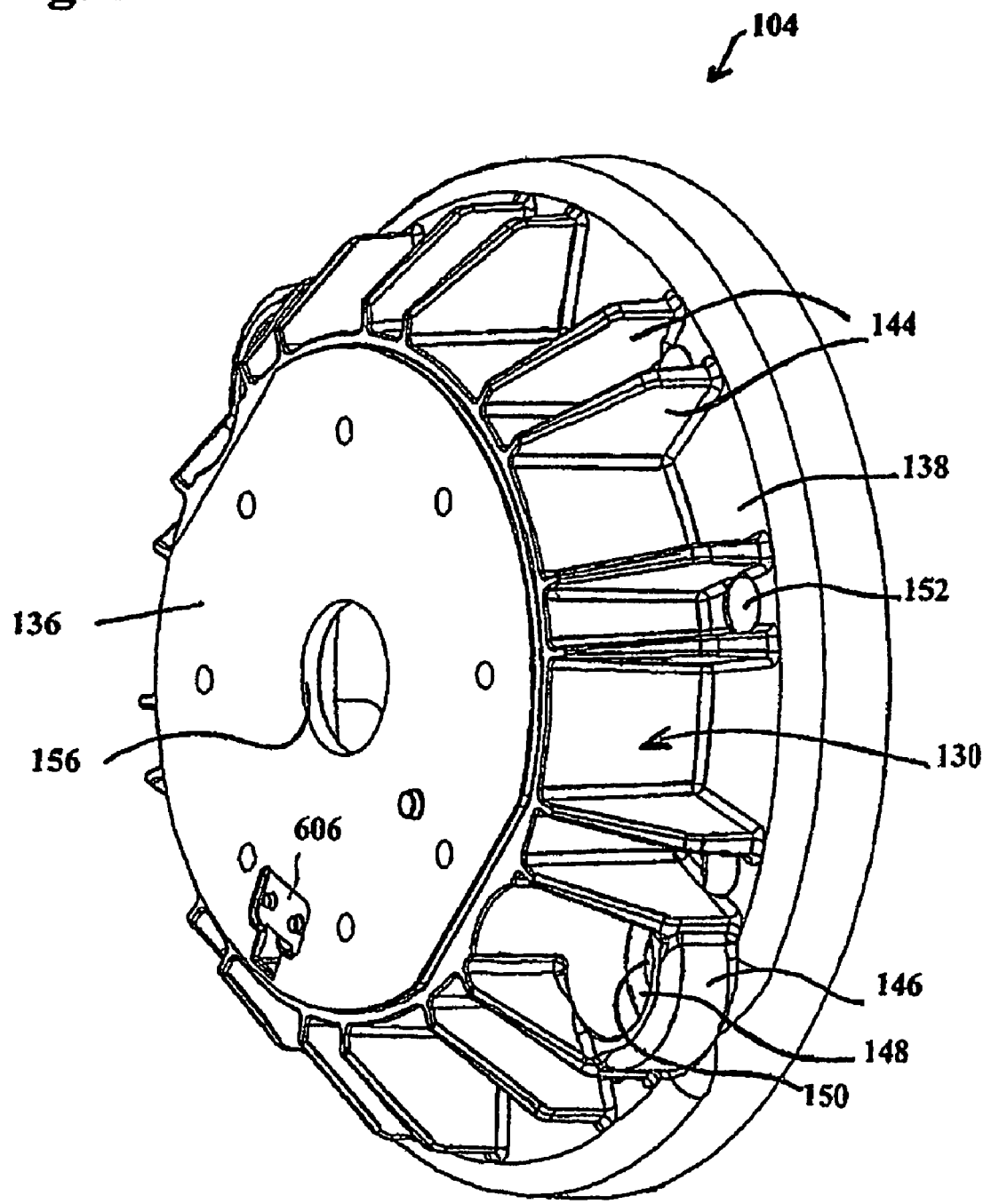
Figure 9:
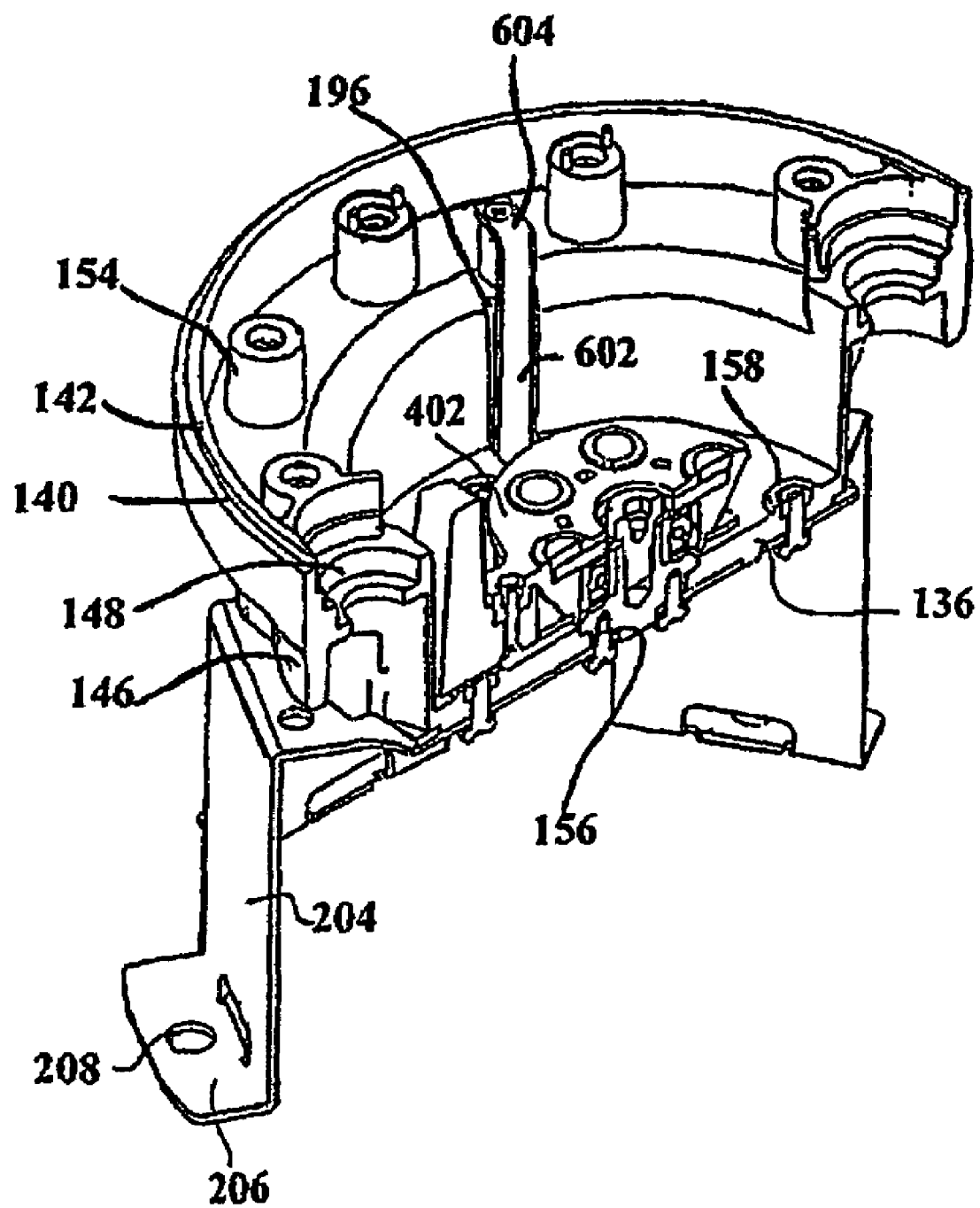
Figure 10:
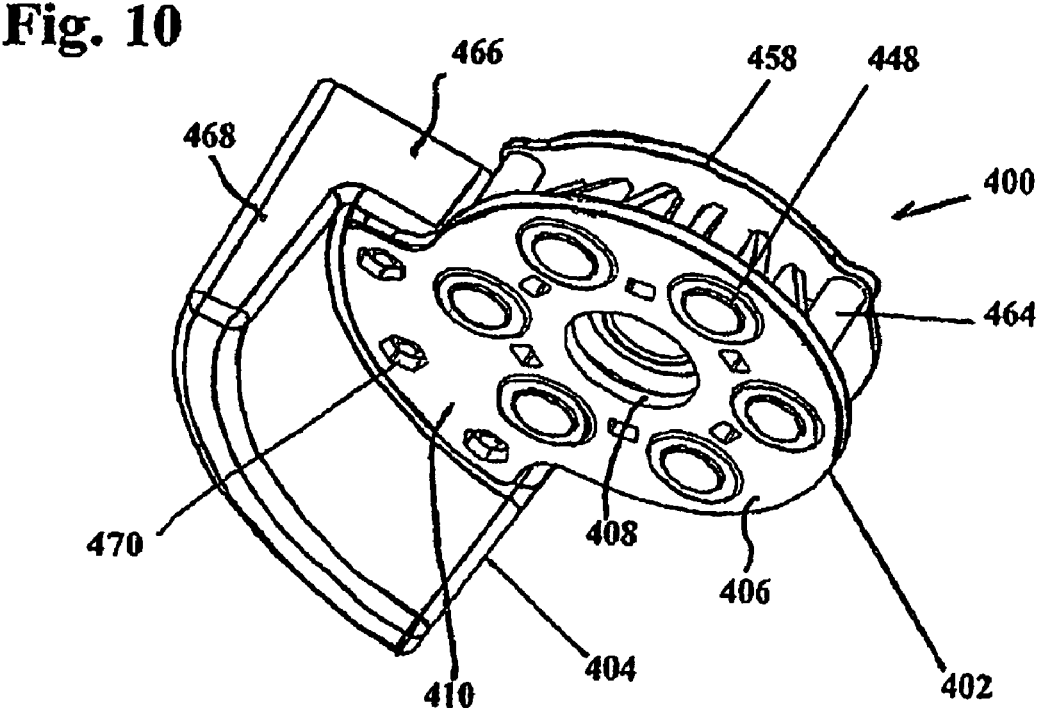
Figure 11:
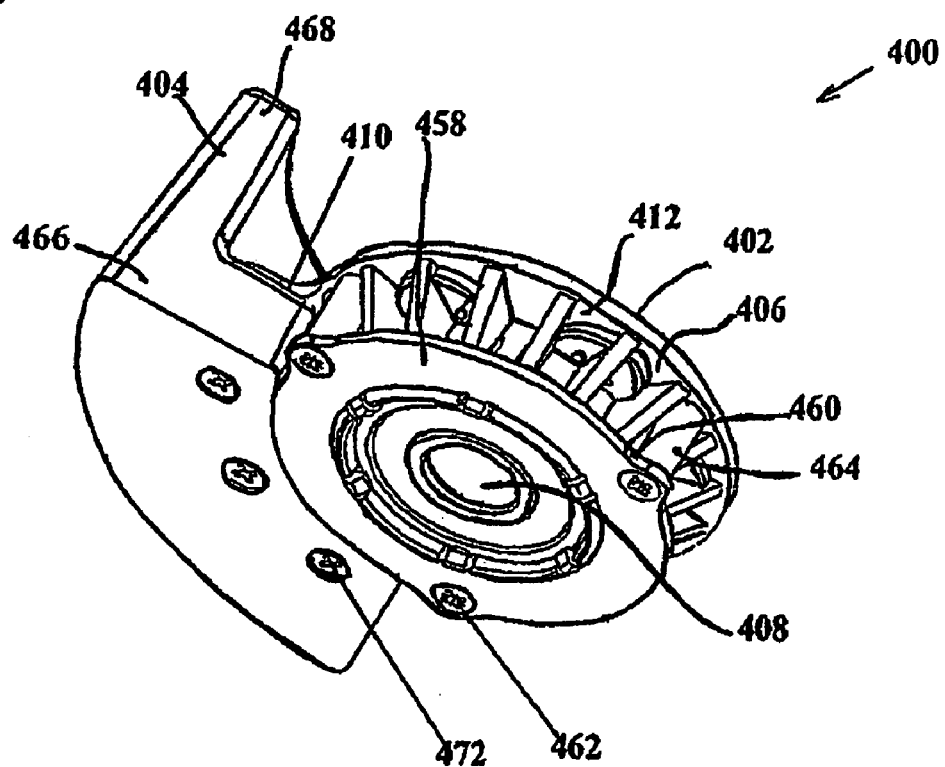
Figure 12:
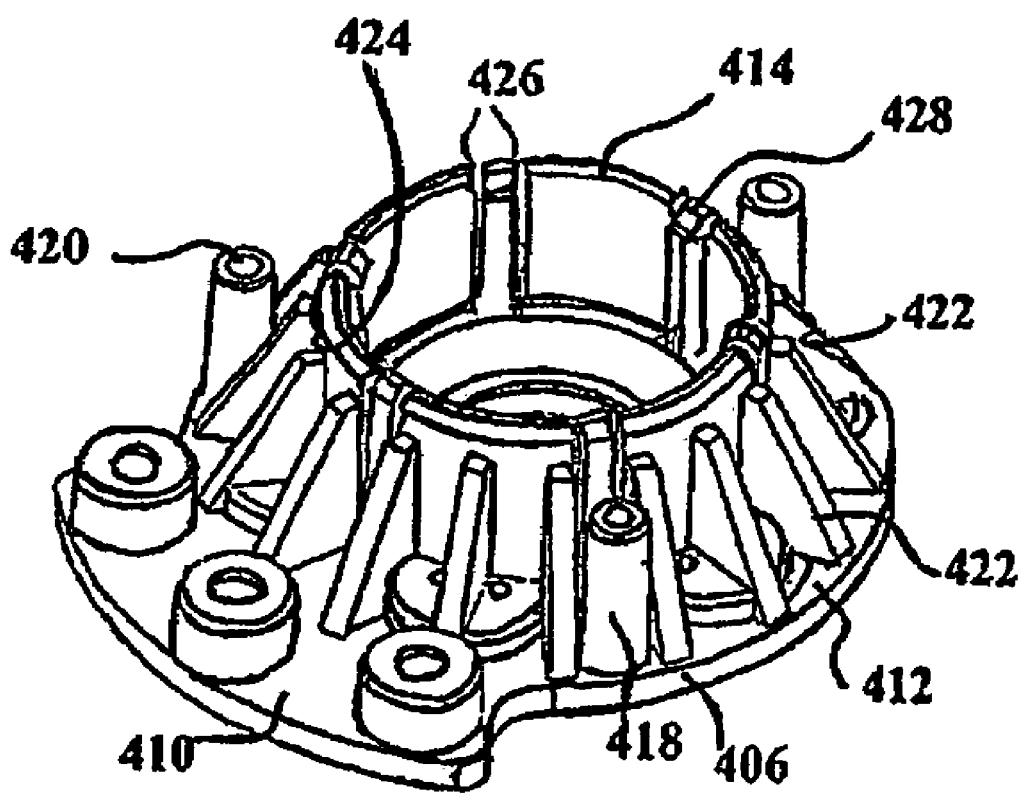
Figure 13:
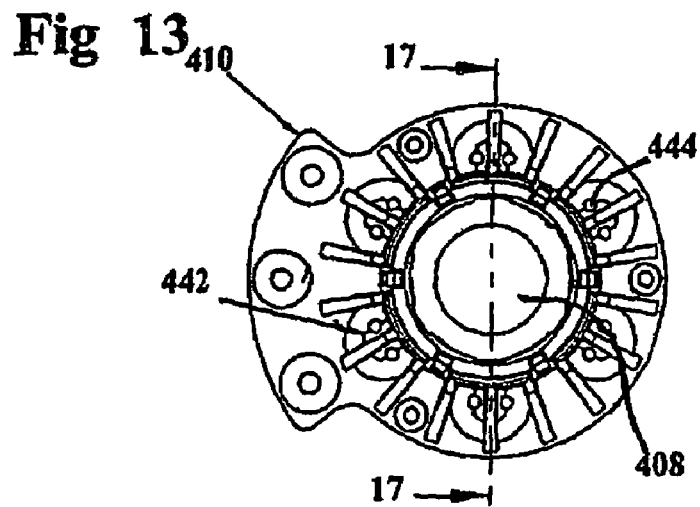
Figure 14:
Figure 15:
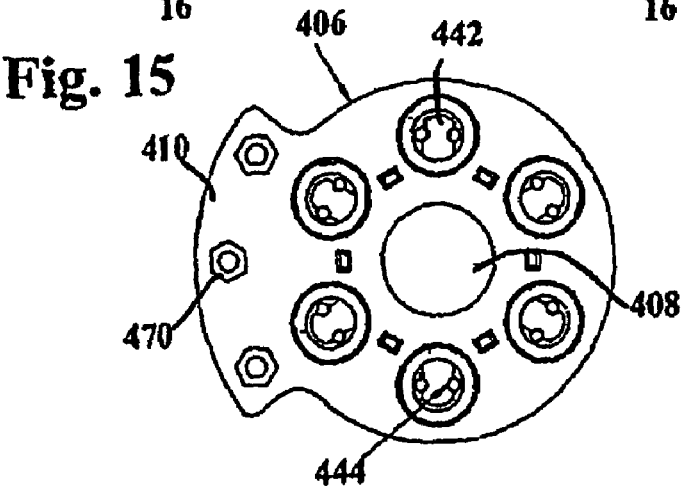
Figure 16:
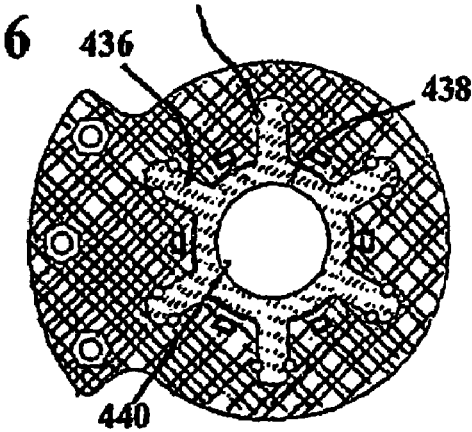
Figure 17:
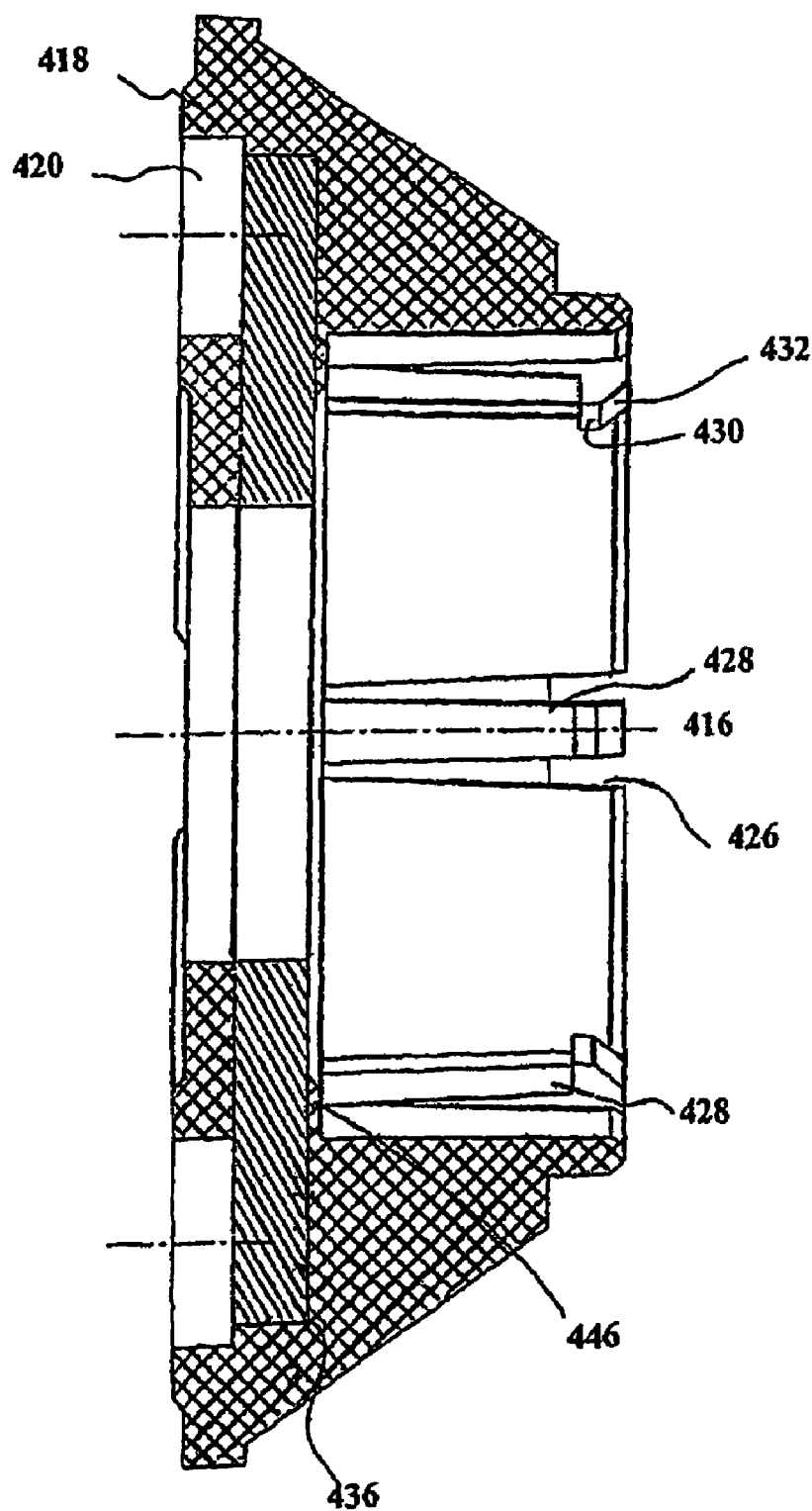
Figure 18:
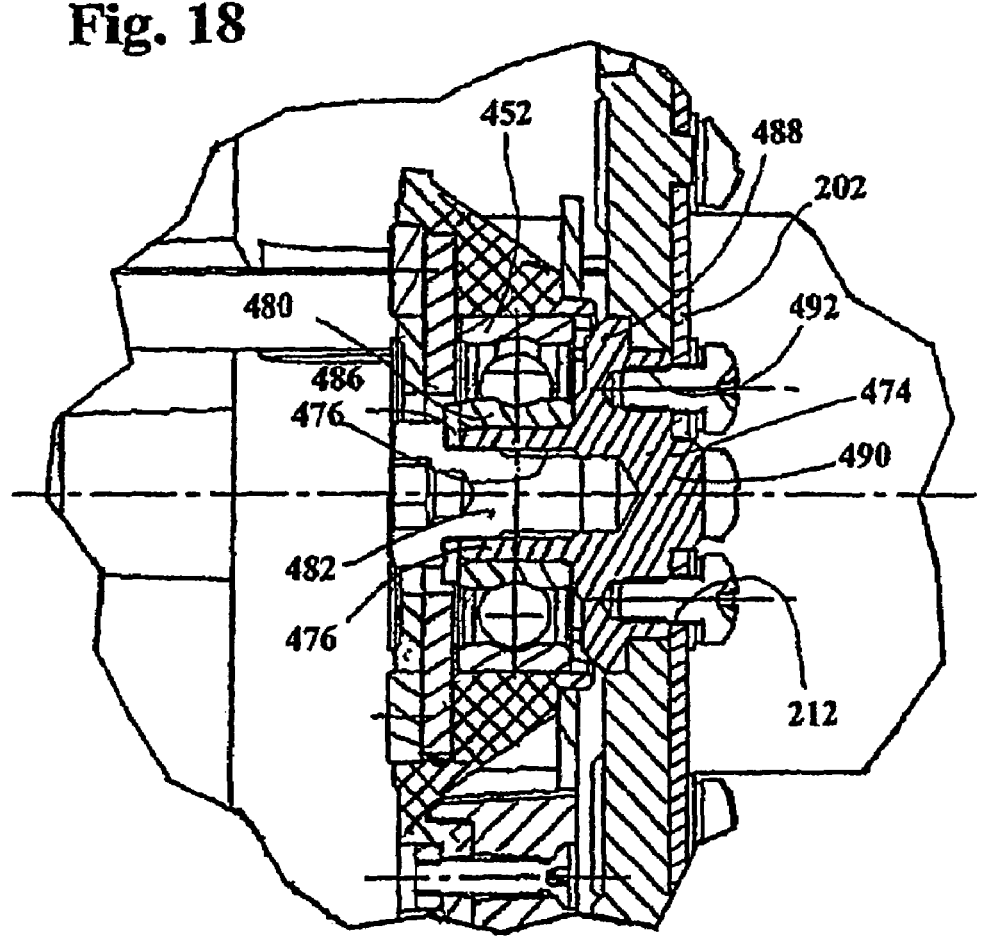
Figure 19:
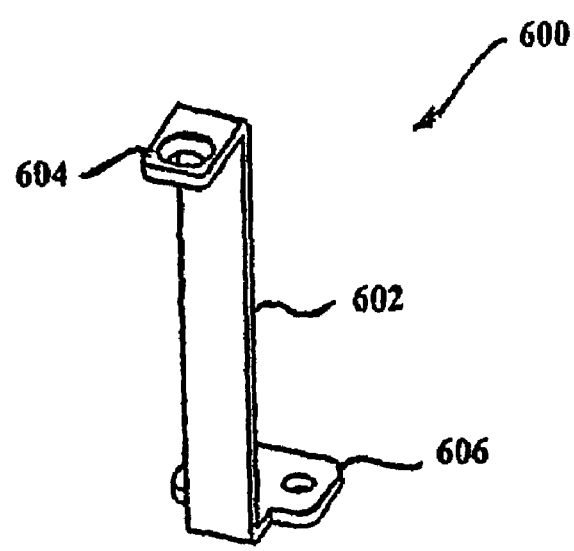
Figure 20:
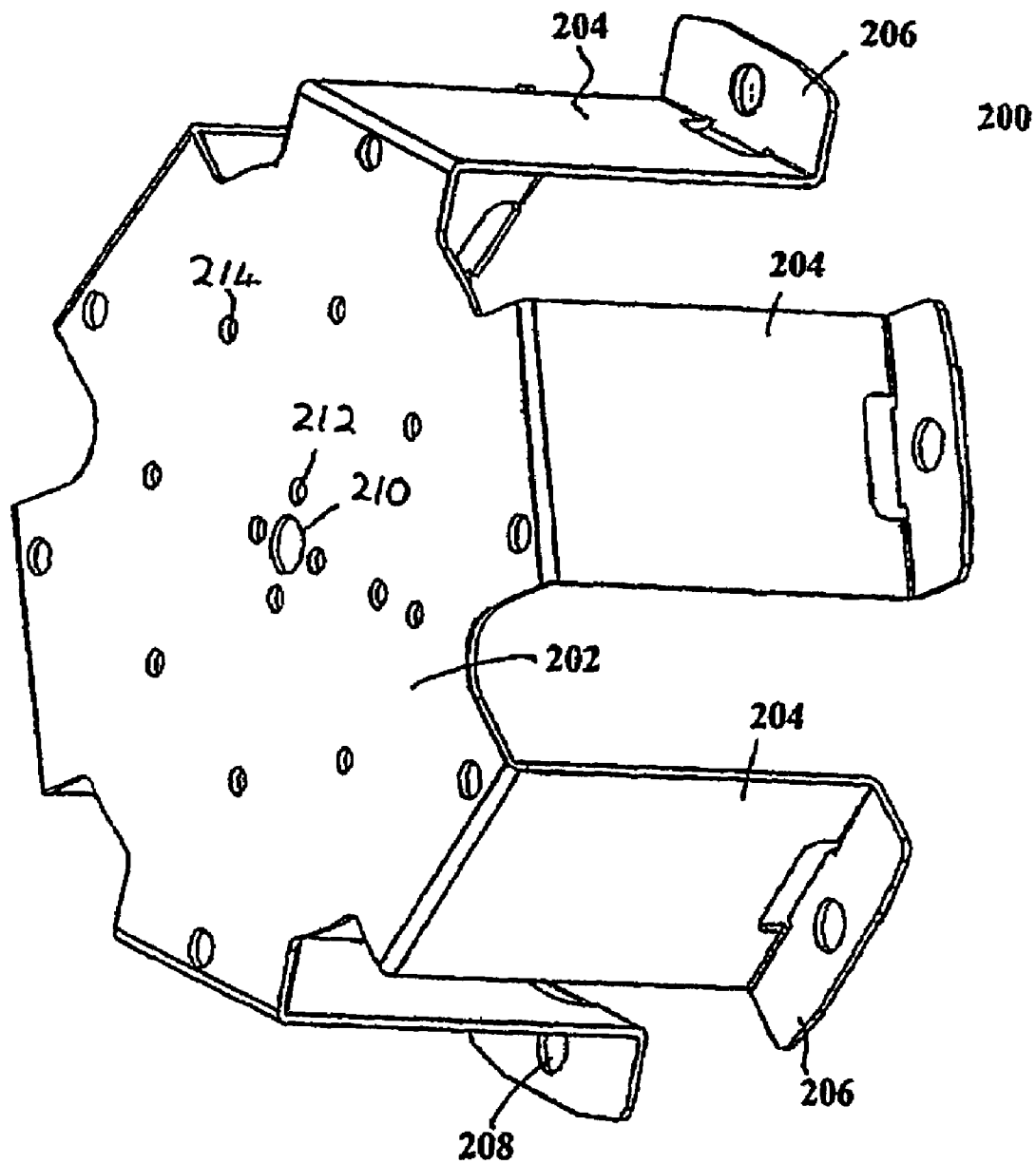
Figure 21:
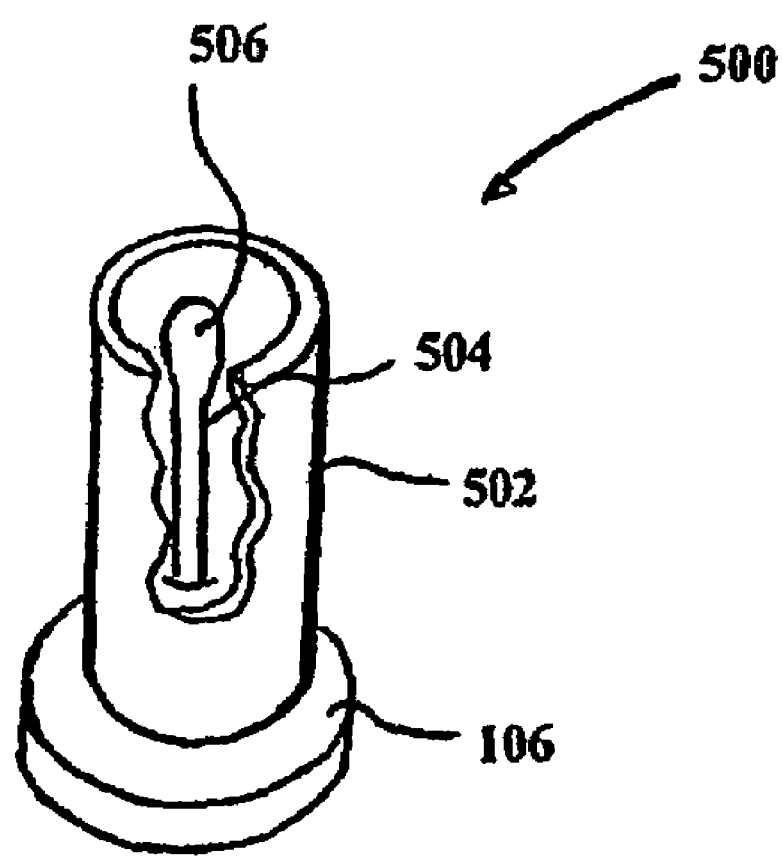

FIG. 1 is a perspective view showing a wheel condition detection and signalling device of the invention in place on a wheel of a truck, FIG. 2 is a section on line 2-2 of FIG. 1, FIG. 3 is an enlarged detail section along the diameter of the device, FIG. 4 is a detail section through the device along a diameter at right angles to that on which FIG. 3 is taken, FIG. 5 is a perspective view from the above of the outer side of the device housing, FIG. 6 is a perspective view from below of the inner side of the device, FIG. 7 is a view showing the PCB mounted on the outer housing part, FIG. 8 is a perspective from below of the inner part of the device, FIG. 9 is a cut-away perspective section through the inner part of the housing showing the pendulum in position, FIGS. 10 and 11 are perspective views of the pendulum arrangement from opposite sides, FIG. 12 is a perspective view of the pendulum, FIGS. 13, 14 and 15 are respectively front, side and rear views of the pendulum, FIGS. 16 and 17 are respectively sections on lines 16-16 and 17-17 of FIG. 13, FIG. 18 is a section through a bearing pin on which the pendulum is rotatably mounted, FIG. 19 is a perspective view of the heat guide, FIG. 20 is a perspective view of the bracket on which the device is carried, FIG. 21 is a perspective view, partially broken away, of the vibration device.

DESCRIPTION OF PREFERRED EMBODIMENTS

Referring now to FIG. 1 there is shown a wheel condition detection and signalling device (WCDSD) 10 of the invention. The WCDSD 10 is mounted on each wheel drum of a truck (including the "horse"). Some (and indeed most) of the wheel drums carry a pair of wheels and tyres. The WCDSD 10 is capable of working with such an arrangement as well as where the wheel drum carries a single wheel and tyre as is shown in the drawings.

This WCDSD 10 comprises a control casing 100 mounted on a carrier bracket 200 carried by a wheel 300 of a truck.

The Carrier Bracket

The carrier bracket 200 (best shown in FIG. 20) is a sheet steel pressing comprising a central land 202 carried by six legs 204 having outwardly directed feet 206 at their ends. Each foot 206 has an opening 208 therethrough. These feet 206 rest on the flange 302 of the dust cap 304 of the wheel 300. Stub bolts (not shown) are provided to secure the dust cap 304 to the wheel 300. Each alternate bolt passes through an opening 208 in a foot 206. Nuts (not shown) engaging the bolts 306 secure the bracket 200 to the wheel 300.

A number of openings 210, 212 and 214 are formed in the land 202. These openings will be described more fully below as will be the way in which they are used.

The Control Casing

The control casing 100 comprises an outer casing part 102 (shown in detail in FIGS. 5 and 6) and an inner casing part 104 (shown in FIGS. 7 and 8). The casing parts 102 and 104 are plastics mouldings preferably comprising Nylon 6/6 with a 30% glass fibre filling.

The outer casing part 102 (see FIGS. 5, 6 and 7) is of circular section, is slightly domed and has a dependent peripheral skirt 112. Internally the casing part 102 has radially extending reinforcing ribs 114 which radiate from a central annulus 116 via an intermediate circular support 118 to an end member 120 adjacent the skirt 112. Small bosses 122 are provided slightly inboard of the skirt 104, each having a projecting top part 124. The bosses 122 are equi-spaced on a circle coaxial with the casing part 102 midway between the support 118 and the end member 120.

Externally the upper part 102 has a pair of upstanding hollow bosses 126 near its periphery at diametrically opposed locations. Each boss 126 has an internal crosspiece 128 through which is a central aperture 130 (best seen in FIG. 3).

The inner part 104 (see FIGS. 8 and 9) comprises a deep dished part 132 having a cylindrical wall 134 and a flat base 136. An outwardly directed flange 132 extends from the end of the wall 132 and ends in a cylindrical rim 140. The rim 140 is twice as thick as the skirt 112 and its inner portion forms a lip 142 which, when the two casing parts 102 and 104 engage together, lies inside the skirt 112.

Externally the inner casing part 104 is provided with reinforcing gussets 144 which extend between the outside of the cylindrical wall 132 and the flange 138. The gussets 144 are arranged in pairs. A pair of upstanding hollow bosses 146 is provided at diametrically opposed locations, each between two pairs of gussets 144. Each boss 146 has an internal crosspiece 148 in which is a central aperture 150 in the same way as the bosses 126.

Between the gussets 144 of each pair is an aperture 152 through the flange 138. Each aperture 152 is continued, on the inner face of the flange 138, in a boss 154 having a countersunk end, the diameter of which is such that the top parts 124 of the bosses 122 are interference fits therein.

The flat base 136 has a central slightly countersunk aperture 156 surrounded by a circle of eight bores 158 the ends of which have hexagonal countersunk portions 160.

Located between the casings 102 and 104 is an internal divider in the form of a disk shaped PCB 162. Near the periphery of the PCB 162 is a series of apertures at such location that the projecting parts 116 of the bosses 114 pass therethrough to engage in the bosses 154 of the lower casing part 104. Bolts (not shown) pass through these apertures to hold the two casing parts together.

At positions corresponding to the positions of the bosses 126 and 146 there are provided on opposite sides of the PCB 162 a pair of hollow nylon cylinders 164 forming pressure chambers which are connected by small apertures (not shown) through the PCB 162 so that their interiors are at the same pressure. The cylinders 164 have flanges 166 by means of which they are bolted together by bolts 168 passing through the flanges 166 and the PCB 162. Suitable O-ring sealing means 170 are provided to ensure that the pressure chambers are properly sealed. Each cylinder 164 carries a pressure valve 172 that projects through the apertures 126 and 154. Within one cylinder 164 of each pair is a pressure sensitive device 174 connected to the electric circuit located below a metal bridge member against which the valve 172 butts and is in electrical contact therewith.

Carried on the lower part of the PCB 162 is a circuit incorporating a transmitter and receiver as well as a battery set 176. The circuit is connected by wires to the bridge member so that by connecting a crocodile clip to each valve 172 electric power may be supplied to the PCB 162 and also to the battery set 176 for any desired requirement such as e.g. reformatting the transmitter or recharging the batteries.

Power Generating Apparatus

Within the dished part 130 there is contained apparatus for generating electric power. This apparatus comprises a coil arrangement 180 and a pendulum arrangement 400 to be described.

The coil arrangement 180 comprises two coils 182 and 184 mounted respectively on the arms 186 of a "C"-shaped laminated core 188 and being carried by mandrels 190 mounted on the underside of the PCB 162. The mandrels 190 have the legs 192 which are bolted to the PCB 162 and have wires (not shown) from the coils connecting to the electric circuit.

The end faces 194 of the arms 186 of the core 188 are flat.

The Pendulum Arrangement

The pendulum arrangement 400 comprises a pendulum 402 and an eccentric weight 404.

The Pendulum

The pendulum 402 is a plastic moulding. It comprises an annular portion 406 with an enlarged central aperture 408 and arcuate projection 410. This projection 410 subtends an angle of about 80° at the centre of the main portion 406. It serves to carry the pendulum weight 404 as will be described below.

The main portion 406 comprises a flat floor 412 with a cylindrical bearing housing 414 of smaller diameter rising therefrom. Equi-spaced on a circle centred on the axis 416 of the housing 414 are six bosses 418 with blind bores 420 respectively therein. The axes of the bosses 418 are parallel to the axis 416 of the main portion 406. The diameter of the circle is about the same as the distance apart of the centres of the end faces 194 of the arms of the core.

Radially extending triangular gussets 422 extend from the housing 414 to the floor 412. At their upper ends, each gusset is cutaway at 422 leading a vertical surface 424 of the housing. Six pairs of closely spaced cuts 426 are provided in the housing 414 between gussets 422. These cuts 426 extend from the top of the housing 414 to form thin arms 428. At its upper end, each arm 428 is provided with an inwardly directed lip 430, the upper surface 432 of which slopes downwardly towards its free end. The under surface of each lip 430 extends in a plane normal to the axis 416 of the main portion 406. The arms 428 are capable of swinging outwardly for the purpose which will be described.

Cast into the main portion 412 is a flat steel insert member 436 (see FIG. 16) comprising an annulus 438 having an aperture 440 which is of slightly less diameter than the inside diameter of the aperture 408. Six arms 442 project radially from the annulus 438 and form part of the bases of the blind bores 420. Two small escape holes 444 are provided through the edges of the arms 440 and through the main portion the base of each boss 418 to provide escape openings as will be described. A narrow flat lip 446 (see FIG. 17) projects above the annulus.

Six cylindrical magnets 448 are provided having their polar axes coaxial with the cylinder i.e. the poles at their ends. They are inserted into the bosses 416 with the projecting ends of alternate magnets being of opposite polarity. The inner ends of the magnets 448 butt against the insert member 436 which provides a magnetic flux path for the magnets 448. The magnets 448 are held in position by bonding agents. Excess bonding agent escapes through the escape holes 444 when the magnets are inserted into the bosses 416.

A roller bearing 450 is located in the housing 414. The outer race 452 seats on the lip 446 which spaces it from the insert member 436. On insertion of the bearing 448, the outer race 452 acts on the inclined outer surfaces 430 to force of the arms 428 outwardly thereby permitting the outer race 452 to enter into the housing 414. When the bearing 450 is homed into the housing 414, the arms 428 swing backward and the lips 430 lie over the outer surface 436 of the outer race 452 holding the bearing 450 firmly in place. A steel securing ring 458 is placed over the gussets fitting into the cutaway portion 422 and encircling the vertical surfaces 422 to prevent the arms 428 swinging outwardly. Three equi-spaced apertured lugs 460 project from the periphery of the ring 458. Screws 462 passing through these lugs 462 engage in the ends of three vertical columns 464 to hold the securing ring 458 in position.

The Pendulum Weight

The pendulum weight 404 (best shown in FIGS. 10 and 11) has a mass of approximately 340 gm. It is generally in the shape of a portion of a segment being an extension of the arcuate projection 410. The weight 404 is generally in the shape of a portion of the segment subtending 80° at the centre of the pendulum. It, the weight 404 is substantially "L" shaped in section having a main deep arcuate portion 466 with a radial inwardly directed leg 468. This leg 468 is received in and can rotate relatively to the casing. Large axially directed countersunk bores 470 are provided through the portion 410. The portion 466 rests against the lower face of the projection 410 of the pendulum 402. The heads of the countersunk bores 470 receive the screws 472 holding the weight to the pendulum.

The Bearing Pin

The bearing 450 is carried on a bearing pin 474. The bearing pin 474 (see FIG. 12) has a cylindrical shaft 476, which has a co-axial blind bore 478, and fits into the inner race 450 of the ball bearing 450. A screw 482 is threaded into the bore 478 having its head 484 acting on the outer face of the inner race 480 through a washer 486. A flange 488 of the bearing pin 474 rests on the central land 202 of the bracket 200. It has a central projection 490 which passes through the central opening 210. Internally threaded blind bores 492 are provided on the underside of the flange 488. Screws passing through the openings 212 secure the bearing pin 474 to the land 202. It will be appreciated that as the bracket comprise metal it will serve as a heat sink for the bearing pin 474 and also will remain rigid during normal and excessive heating of this part.

It will be appreciated that when mounted on the wheel, the axis 416 of pendulum arrangement will be horizontal.

It will be seen therefore that as the wheel 300, and with each of them the WCDSD 10, rotates about a horizontal axis, the pendulum 402 carrying the heavy counterweight 404 will remain substantially stationary. Thus the end faces 194 of the coils 182 and 184 will pass by the magnets 448 which will induce an electrical current into the coils 182 and 184. Such electrical current will serve to provide power for the PCB and the programmable integrated circuit (incorporating the transmitter carried thereby. It will be noted that when any magnet is opposite one arm of the core, the magnet opposite the other arm would be of the opposite polarity.

A Heat Detector

A heat detector 600 is provided. It comprises a bent sheet metal heat guide 602 (see FIG. 19) having a short leg 604 at one end and a wider slightly longer leg 606 at the other end. The guide 602 is received in an axial slot 196 in the wall 134 (see FIG. 9). The short leg 606 extends on the outside of the base plate 136 of the dished part 132 and is bent to lie flat thereagainst. It is clamped by the base plate 136 against the land 202 of the bracket which serves as a heat sink. The other leg 604 is screwed to a projection of the lower part close to the PCB 106 and is connected to a heat sensor 610 on the PCB. The heat sensor in turn is connected to the programmable integrated circuit or microprocessor. Should the temperature of the wheel increase beyond a certain amount, the heat transferred by the heat guide 602 to the heat sensor 610 will increase beyond a predetermined amount. The microprocessor will recognise this as an unacceptable situation.

Vibration Detector

At the centre of the PCB 162 in the outer casing 102 there is a vibration detector 500 (see FIG. 21). The vibration detector 500 comprises a metal cylinder 502 and a clapper 504. The cylinder 502 is secured to the PCB 162 and is connected to an appropriate electronic member (not shown). The clapper 504 has a heavy head 506. It is located centrally of the cylinder 502 and is capable of swinging when the wheel is subjected to vibration. The clapper 504 is connected to another electronic member. Should the wheel vibrate, the clapper 504 will swing and make contact with the cylinder 502, this will complete the circuit between the two electronic members which will convey this information to the microprocessor. Should the vibration be due to road irregularities then the vibration will be arbitrary and will be recognised as such by the microprocessor. However if the tyre on the wheel should shed some tread, the vibration would be cyclical. This will be recognised by the microprocessor as an unacceptable condition.

Pressure Connectors

A short copper or reinforced rubber pipe (not shown) having suitable connectors (not shown) at its ends is connected to the valve of the tyre and one valve 172. Thus the interior of the appropriate pressure chambers are subject to the air pressure in the tyre. The pressure gauges 174 within the interiors are therefore subject to the air pressure of the tyre to which it is connected. The pressure gauge 174 is connected to the microprocessor. Accordingly should the pressure in a tyre fall below a predetermined pressure, the microprocessor will recognise this as an unacceptable condition.

The tyre can be inflated through the other valve 172 of the pair.

If the wheel drum carries two tyres, then the valve of the second tyre will be connected to one of the valves 172 of the other pair of valves.

Operation

The microprocessor is arranged to activate the transmitter to send an appropriate signal when it, the microprocessor, detects an unacceptable condition as described above. A receiver (not shown) to receive such a signal is normally provided in the cabin of the truck. This is capable of indicating the particular unacceptable condition and identifying the wheel or tyre to which it applies. Thus the driver will be aware of any unacceptable condition as soon as it arises.

As mentioned, the coil provides electric power to the electronic circuitry on the PCB. It will be appreciated that when the vehicle is stationary or is moving extremely slowly no or not enough power will be generated in the coils for this purpose. The batteries 176 will now supply the appropriate power. A field effect transmitter is provided in the circuity and is arranged so that once an adequate amount of power is being generated by the coils, power will be supplied by the coils through the batteries. Thus no more current will be drawn from the batteries and more than adequate power is provided by the coils. When the coils are supplying power, they also serve to recharge the batteries. Thus the batteries will have a long life. Also there will be constant power supplied by the coils when the vehicle is travelling.

The microprocessor further may incorporate a receiver which can receive a signal from a tag inserted into a tyre. This information can be transmitted to the receiver and in due course downloaded into a main computer used by the transport operator. This data may be used to give information about what distance any particular tyre has travelled irrespective of on what vehicle it has been mounted. It will also provide information about unauthorised swapping or rotating of tyres.

It has been found that the generator system comprising the coil and pendulum arrangement as described above produces enough power for the circuitry and the microprocessor and in particular the transmitter. However should the device be placed on the wheel of a multi trailer unit, the transmitter may not have a long enough range to transmit signals to the receiver in the cabin of the truck or there may be too much interference to transmit the signal over this distance. To overcome this difficulty, each trailer unit may be provided with a wire connector leading from the rear of the unit to the front. At the rear of the unit there may be a receiver connected to the wire. A transmitter is connected to the front end of the wire. Thus the signal can be transmitted through such wires over a great distance to the receiver in the cabin. Alternatively such signal can be supplied by a "daisy chain" of transmitters and receivers at each of the trailers.

Miscellaneous

It has been found that the arrangement of the magnets on the pendulum and their arrangement relative to the faces of the coil provides a very satisfactory electrical generator which can generate adequate power for the transmitter even at relatively low rotational speeds of the wheels. Typically it can operate satisfactorily even at as low revolutions as 50 to 55 rpm (which with a one metre diameter tyre is equivalent to 10 kilometres per hour).

By having the pressure detectors within the pressurised chambers damage to the detectors that occurs in arrangements where a pipe is connected directly to the detectors is obviated.

The power generated as aforesaid may be put to additional purposes. For example, the number of revolutions which the tyre makes can be ascertained by counting the number of pulses generated by the magnets passing the ends of the coil. This number must the divided by the number of magnets to indicate a number of revolutions.

It will be seen that overall the arrangement as above described works extremely satisfactory in giving signals to the driver as to unacceptable conditions. Thus the driver is able to take remedial action quickly which prevents more serious conditions occurring.

It will be seen that if a differential gear should fail and lock or a wheel bearing seizes or a brake should instantaneously lock, the number of revolutions of the wheel will be reduced or even ceased. This condition will be detected by comparing the revolutions of all the wheels to see that which is not rotating.

In another example, a scanner system may be provided for determining the tyre wear. The scanner may be arranged to detect the length of the road over which the truck passes. The microprocessor will calculate the number of revolutions that the wheel completes when passing over this length of road. The microprocessor can thus determine the circumference of the tyre and hence the diameter of the tyre. After the tyre has worn the diameter of the tyre decreases and hence the wear of the tyre tread can thus be calculated by the microprocessor. Should the wear be too great this will be detected as an unacceptable condition and treated as mentioned above. In order that extraneous conditions do not affect this operation, it is preferably best effected when the truck commences its journey and is moving slowly.

The invention is not limited to the precise constructional details hereinbefore described and illustrated in the drawings. For example the device may be modified to detect unacceptable conditions on railway wheels. Here the unacceptable conditions would be excessive heat, excessive vibration and excessive wear of the periphery of the wheel. Railway units can be extremely long. Therefore the wire arrangements mentioned above (i.e. a wire extending along the length of each truck and having a receiver at the rear end and transmitter at the front end or the daisy chain") may be essential for signals to reach a receiver in the driver's cabin in the traction unit.

The invention claimed is:

1. A wheel condition detection and signalling device comprising:—
    a chamber which is capable of being attached to a wheel of a truck to rotate therewith,
    a pendulum having significant mass and being rotatably mounted within the chamber in such manner that the pendulum remains generally non-rotating during rotation of the chamber,
    detector means for detecting an unacceptable condition of the wheel and emitting a signal dependant upon such condition and
    a transmitter for transmitting that signal to a receiver
  wherein
    the chamber carries a wire coil which is mounted on a core having two outside parallel arms provided with end faces and
    the pendulum carries a series of magnets of opposite polarity, the arrangement being such
    that on relative rotation of the chamber and the pendulum, the magnets will pass the end faces of the coil in adjacent relationship, and
    that when one magnet is adjacent one end face of the coil, another magnet of opposite polarity is adjacent the other end face of the coil whereby on relative rotation of the coils and the poles, an electric current is generated in the coils to energise the transmitter.

2. A device as claimed in claim 1 wherein the coils are connected to the transmitter so that the power from the coils may be Used to power the transmitter directly.

3. A device as claimed in claim 1 further comprising a battery which provides power during no or very slow movement of the wheels.

4. A device as claimed in claim 3 wherein the battery is a rechargeable battery which is connected to the coil so that when the wheel is rotating quickly the battery can be recharged by the electric power in the coil.

5. A device as claimed in claim 3 comprising more than one battery.

6. A device as claimed in claim 1 wherein the magnets are arranged in a circle on the pendulum centred on the axis of rotation of the pendulum and having a diameter approximately equal to the distance apart of the centres of the end faces of the coil.

7. A device as claimed in claim 1 wherein there are a double odd number of magnets.

8. A device as claimed in claim 7 wherein there are six magnets.

9. A device as claimed in claim 1 wherein the magnets are arranged with their polar axes parallel to the axis about which the pendulum swings.

10. A device as claimed in claim 5 further comprising a metal member against which the magnets bear and which forms a flux path for the magnets.

11. A device as claimed in claim 1 wherein the pendulum comprises an annular part rotatably carried by a bearing and an eccentric weight projecting therefrom.

12. A device as claimed in claim 11 wherein the annular part carries the magnets on one face thereof.

13. A device as claimed in claim 11 wherein the eccentric weight comprises a heavy material.

14. A device as claimed in claim 13 wherein the heavy material comprises lead.

15. A device as claimed in claim 13 wherein the eccentric weight has a mass of between 200 gm and 500 gm.

16. A device as claimed in claim 15 wherein the eccentric weight has a mass of between 320 gm and 360 gm.

17. A device as claimed in claim 16 wherein the eccentric weight has a mass of about 340 g.

18. A device as claimed in claim 13 wherein the weight is bolted on to a member projecting from the annular part.

19. A device as claimed in claim 11 wherein the member further comprises a substantially cylindrical part within which the bearing is received.

20. A device as claimed in claim 11 wherein the cylindrical part has inwardly directed means at its mouth or open end.

21. A device as claimed in claim 20 wherein the cylindrical part is capable of being resiliently distorted to permit the bearing to enter the said part, the arrangement being such that when the part returns from the distorted position, the inwardly directed means extends into the path of the bearing to prevent or inhibit it from being removed from the said part.

22. A device as claimed in claim 21 wherein the cylindrical part is provided with a plurality of pairs of closely spaced cuts or slots that define between them arms which can resiliently swing outwardly.

23. A device as claimed in claim 22 wherein the inwardly directed means are provided at the ends of the said arms.

24. A device as claimed in claim 1 comprising a pressure detection means is incorporated in a chamber which is capable of being connected to a tyre to be subject to the pressure therein.

25. A device as claimed in claim 1 comprising a heat conductor having a part projecting into thermal contact with the part of the wheel and another part in direct or indirect communication with a heat detector connected to the transmitter.

26. A device as claimed in claim 1 comprising a vibration detector.

27. A device as claimed in claim 26 wherein the vibration detector comprises a cylinder with a movable clapper therein.

28. A device as claimed in claim 1 wherein the device is be used on the wheels of a truck.

29. A device as claimed in claim 1 wherein the device is be used on the wheels of a railway carriage.

30. A device as claimed in claim 1 wherein there is provided a receiver to receive signals from a similar device and to relay such signals to another device.

* * * * *